United States Patent Office 3,050,442
Patented Aug. 21, 1962

3,050,442
METHOD OF DESTROYING NEMATODES WITH POLYTHIENYL COMPOUNDS
Johan Dirk Bijloo, Jan Hendrik Uhlenbroek, and Jasper Daams, Van Houtenlaan, Weesp, Netherlands, assignors to North American Philips Company, Inc., New York, N.Y., a corporation of Delaware
No Drawing. Filed May 21, 1958, Ser. No. 736,687
Claims priority, application Netherlands May 31, 1957
8 Claims. (Cl. 167—33)

It has been found that α-polythienyls, which may be substituted by alkyl-groups and/or by halogen, and have the general formula:

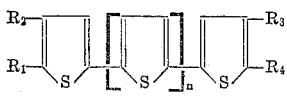

wherein $n$ represents the value 0 or 1 and the substituents $R_1$, $R_2$, $R_3$ and $R_4$ designate hydrogen, a saturated or an unsaturated alkyl-group or a halogen atom, or one of these substituents is a nitro-group, an aliphatic acyl-group or a phenyl-group, or when $n=0$, $R_1$, $R_2$ and $R_4$ designate hydrogen and $R_3$ a thiophene-group, have an activity against noxious organisms.

The invention therefore relates to a method of producing means for combating noxious organisms and is characterized in that a compound of the general formula:

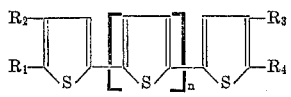

wherein $n$ represents the value 0 or 1, and the substituents $R_1$, $R_2$, $R_3$ and $R_4$ denote hydrogen, a saturated or an unsaturated alkyl-group or a halogen atom, or one of these substituents is a nitro-group, an aliphatic acyl-group or a phenyl-group, or when $n=0$, $R_1$, $R_2$ and $R_4$ designate hydrogen and $R_3$ a thiophene-group, is mixed with a pulverulent inert carrier, or dissolved or dispersed or, as a solution emulsified in an inert solvent if desired with the addition of surface-active substances, dispersion agents or adhesives. An unsaturated alkyl-group is to be understood to include an acetylene-hydrocarbon radical, for example —$CH_2 \cdot C \equiv CH$.

The compounds of the general formula given above were found by laboratory experiments and experiments in the soil, to have an activity against nematodes and against many herbaceous plants in agriculture and horticulture.

Particularly those nematodes are attacked by the compounds according to the invention which produce eelworm diseases in plants, for example Heterodera, for instance larvae of *Heterodera rostochiensis* (potato cysticolous eelworm), species of Meloidogyne (root knob eelworm), species of Ditylenchus (stem eelworm), species of Pratylenchus and species of Hoplolaimus.

The experiments which proved the nematocidal effect of the compounds according to the invention were carried out as follows:

Into an embryo dish of 4 x 4 cms., in which a cavity of 3.5 mls. is recessed, is introduced 1.5 mls. of the solution to be tested, an emulsion or a dispersion thereof of about 100 nematodes. The dish is closed by a roughly ground glass guard, so that a sufficient quantity of oxygen can penetrate and the nematodes are not immobilized by lack of oxygen. The movability and the kill of the nematodes are assessed after 4, 24, 50 and 140 hours with the aid of a binocular. The kill percentage is determined on the ground of decolouring or disintegration of the organisms. The experiments were carried out with the following nematodes: larvae of *Heterodera rostochiensis* (potato cysticolous eelworm) of 2 to 3 days, *Ditylenchus dipsaci* (stem eelworm) a mixed population of larvae and adult species, which were soaked for one night from the dried state, *Anguina tritici* (wheat gall eelworm), the larvae having been soaked for one night from infected wheat corn.

EXAMPLE I 25 mgs. of α-terthienyl was ground to a high degree of fineness with the addition of 10 drops of a 5% aqueous polyoxy-ethylene-sorbitan-monolaurate solution (in the form of the commercial preparation of Atlas G75967). Thus a half-disperse, half-colloidal solution was obtained, from which, by diluting it with water, a series of dilutions was composed. The results obtained with this solution are apparent from the following table.

Table 1
KILL PRC. AT THE FINAL ASSESSMENT AFTER 140 HOURS

| Nematodes | Conc. act. substance in p.p.m. | | | | | | | | |
|---|---|---|---|---|---|---|---|---|---|
| | 100 | 50 | 25 | 12½ | 6¼ | 3⅛ | 1%₆ | 25⁄32 | 25⁄64 |
| *Heterodera rostochiensis* | 100 | 100 | 100 | 100 | 100 | 100 | 100 | 100 | 97 |
| *Ditylenchus dipsaci* | 100 | 100 | 100 | 100 | 100 | 80 | 94 | 68 | 25 |
| *Anguina tritici* | 100 | 100 | 100 | 100 | 100 | 100 | 100 | 100 | 100 |

EXAMPLE II 25 mgs. of 5,5'-dimethyl α'-bithienyl was ground to a high degree of fineness, whilst 10 drops of a 5% aqueous emulsifier solution (Atlas G 7596 J) are added. Thus a half-disperse, half-colloidal solution is obtained, from which, by diluting it with water, a sequence of dilutions is composed.

Table 2
KILL PRC. AT THE FINAL ASSESSMENT AFTER 140 HOURS

| Nematodes | Conc. act. substance in p.p.m. | | | | | | |
|---|---|---|---|---|---|---|---|
| | 100 | 50 | 25 | 12½ | 6¼ | 3⅛ | 1%₆ |
| *Heterodera rostochiensis* | 100 | 100 | 100 | 100 | 100 | 100 | 100 |
| *Ditylenchus dipsaci* | 100 | 100 | 100 | 100 | 75 | 70 | --- |
| *Anguina tritici* | 100 | 100 | 100 | 100 | 100 | 100 | 90 |

EXAMPLE III 25 mgs. of 5.5''-dimethyl α-terthienyl was ground to great fineness with the addition of 10 drops of a 5% aqueous emulsifier solution (Atlas G 7586 J). Thus a half-disperse, half-colloidal solution is obtained, from which, by diluting it with water, a sequence of dilutions is composed.

Table 3
KILL PRC. AT THE FINAL ASSESSMENT AFTER 140 HOURS

| Nematodes | Conc. act. substance in p.p.m. | | | | | | | | |
|---|---|---|---|---|---|---|---|---|---|
| | 100 | 50 | 25 | 12½ | 6¼ | 3⅛ | 1%₆ | 25⁄32 | 25⁄32 |
| *Heterodera rostochiensis* | 100 | 100 | 100 | 100 | 100 | 100 | 100 | 100 | 100 |
| *Ditylenchus dipsaci* | 100 | 100 | 100 | 100 | 100 | 100 | 100 | --- | --- |
| *Anguina tritici* | 100 | 100 | 100 | 100 | 100 | 100 | 100 | 100 | 100 |

EXAMPLE IV 25 mgs. of 5-bromo-α-terthienyl was ground to a high degree of fineness with the addition of 10 drops of a 5% aqueous emulsifier-solution (Atlas G 7596 J). Thus a half-disperse, half-colloidal solution is obtained from which diluting it, a sequence of dilutions is composed.

Table 4

KILL PRC. AT THE FINAL ASSESSMENT AFTER 140 HOURS

| Nematodes | Conc. act. substance in p.p.m. | | | | | | | |
|---|---|---|---|---|---|---|---|---|
| | 100 | 50 | 25 | 12½ | 6¼ | 3⅛ | 1 9/16 | 25/32 |
| Heterodera rostochiensis | 100 | 100 | 100 | 100 | 100 | 100 | 80 | 90 |
| Anguina tritici | 100 | 100 | 100 | 100 | 100 | 100 | 100 | 100 |

EXAMPLE V 25 mgs. of 5-propionyl-2.2'-bithienyl is ground to great fineness under the addition of 10 drops of a 5% aqueous emulsifier solution (Atlas G 7596 J). Thus a half-disperse, half-colloidal solution is formed, from which by dilution a dilution series is made.

Table 5

KILL PRC. AT THE FINAL ASSESSMENT AFTER 140 HOURS

| Nematodes | Conc. act. substance in p.p.m. | | | | | | | |
|---|---|---|---|---|---|---|---|---|
| | 100 | 50 | 25 | 12½ | 6¼ | 3⅛ | 1 9/16 | 25/32 |
| Heterodera rostochiensis | 100 | 100 | 100 | 100 | 100 | 100 | 50 | 30 |
| Ditylenchus dipsaci | 100 | 100 | 100 | 100 | 99 | 30 | 20 | 20 |
| Anguina tritici | 100 | 100 | 100 | 100 | 100 | 100 | 100 | 100 |

EXAMPLE VI 25 mgs. of 5-nitro-2.2'-bithienyl is ground to great fineness under the addition of 10 drops of a 5% aqueous emulsifier solution (Atlas G 7596 J). Thus a half-disperse, half-colloidal solution is formed, from which, by dilution, a dilution series is made.

Table 6

KILL PRC. AT THE FINAL ASSESSMENT AFTER 140 HOURS

| Nematodes | Conc. act. substance in p.p.m. | | | | | | | | |
|---|---|---|---|---|---|---|---|---|---|
| | 100 | 50 | 25 | 12½ | 6¼ | 3⅛ | 1 9/16 | 25/32 | 25/64 |
| Heterodera rostochiensis | 100 | 100 | 100 | 100 | 100 | 100 | 100 | 100 | 70 |
| Ditylenchus dipsaci | 100 | 100 | 100 | 100 | 100 | 100 | 95 | 30 | 20 |
| Anguina tritici | 100 | 100 | 100 | 100 | 100 | 100 | 100 | 100 | 100 |

EXAMPLE VII 25 mgs. of 5-phenyl-2.2'-bithienyl is ground to great fineness under the addition of 10 drops of a 5% aqueous emulsifier solution (Atlas G 7596 J). Thus a half-disperse, half-colloidal solution is formed, from which, by dilution, a dilution series is made.

Table 7

KILL PRC. AT THE FINAL ASSESSMENT AFTER 140 HOURS

| Nematodes | Conc. act. substance in p.p.m. | | | | |
|---|---|---|---|---|---|
| | 100 | 50 | 25 | 12½ | 6¼ |
| Heterodera rostochiensis | 100 | 100 | 100 | 100 | 100 |
| Ditylenchus dipsaci | 100 | 90 | 100 | 90 | 100 |
| Anguina tritici | 100 | 100 | 100 | 100 | 100 |

EXAMPLE VIII 25 mgs. of 5.5'-dichlor-2.2'-bithienyl is ground to great fineness under the addition of 10 drops of a 5% aqueous emulsifier solution (Atlas G 7596 J). Thus a half-disperse, half-colloidal solution is formed, from which, by dilution, a dilution series is made.

Table 8

KILL PRC. AT THE FINAL ASSESSMENT AFTER 140 HOURS

| Nematodes | Conc. act. substance in p.p.m. | | | | | | | | |
|---|---|---|---|---|---|---|---|---|---|
| | 100 | 50 | 25 | 12½ | 6¼ | 3⅛ | 1 9/16 | 25/32 | 25/64 |
| Heterodera rostochiensis | 100 | 100 | 100 | 100 | 100 | 100 | 100 | 100 | 70 |
| Ditylenchus dipsaci | 100 | 100 | 100 | 100 | 100 | 100 | 100 | 70 | 60 |
| Anguina tritici | 100 | 100 | 100 | 100 | 100 | 100 | 100 | 100 | 100 |

Similar results were obtained with 5-methyl α-terthienyl. In order to combat nematodes on materials or objects infected thereby, for example parts of plants or on materials or objects coming into contact with these plants, they are brought into contact with an α-polythienyl compound according to the invention. To this end the compound may be emulsified or suspended in water, preferably with the use of an emulsifier, be dissolved in an organic solvent or be mixed with a solid substance, the preparations thus obtained being distributed over the infected materials or objects.

The phytotoxic effect of the compounds according to the invention appeared from the following experiments with α-bithienyl and α-terthienyl.

The compound to be tested was dissolved in acetone (concentration 1% by weight). Then this liquid was sprayed over a number of oats-, beet-, tomato- and bush-bean-plants to a quantity corresponding to 10 kgs. of active substance per hectare. A similar experiment was carried out with a 3% acetonic solution, this solution being, however, sprayed on plants to a quantity corresponding to 30 kgs. of active substance per hectare. Each series of experiments was carried out with two plants each. Ten days after the spraying it was fixed to what extent the plants had suffered from the treatment. The following measure was applied for judgment.

No burning=0
0 to 1/10 of the plant surface burnt=1
1/10 to ⅓ of the plant surface burnt=2
⅓ to ⅔ of the plant surface burnt=3
⅔ to 9/10 of the plant surface burnt=4
9/10 to the whole plant surface=5
Completely killed=6

| | Bush-bean | Tomato | Oats | Beet | Bush-bean | Tomato | Oats | Beet |
|---|---|---|---|---|---|---|---|---|
| α-Bi-thienyl | 0 | 2 | 0 | 2 | 3 | 4 | 1 | 3 |
| α-Terthienyl | 3 | 6 | 3 | 5 | 4 | 6 | 5 | 6 |

Furthermore, the α-terthienyl was sprayed in a concentration of 1% to a quantity corresponding to 10 kgs./hectare on a number of young plants to be enumerated hereinafter. The results stated after 21 days are indicated after the names of the plants.

*Polygonum convolvulus* (black bindweed): growth strongly checked.
*Rumex acetosa* (sorrel): growth strongly checked.
*Lappa notha* (bastard burdock): growth strongly checked.
*Capsella bursa pastoris* (shepherd's pouch): growth strongly checked.
*Urtica ureaus* (small stinging nettle): killed.
*Stenophragma thalianum* (hedge mustard): growth strongly checked.
Matricaria species (camomile): growth strongly checked.
*Seneco vulgaris* (groundsel): growth strongly checked.
Germinated darnel: growth strongly checked.
*Stellaria media* (chickweed): killed.

In accordance with the aforesaid, experimental results the invention relates particularly to a method of producing a means of combating nematodes and to a method of producing a means for combating herbaceous plants and furthermore to combating means thus obtained.

For producing these means of combating, in principle, known methods may be used. For example, the α-polythienyls of the formula according to the invention may be mixed with a pulverulent, inert carrier or dissolved or dispersed or, as solution, suspended in an inert solvent, or dispersion agent respectively, if desired with the addition of surface-active substances, dispersion agents or adhesives.

Of the compounds to be employed in accordance with the invention a number has been described in literature, amongst others by Steinkopf in "Die Chemie des Thiophens," 1941, pages 141 to 152, by Steinkopf, Leidsmann and Hofmann in "Annalen," 546 (1941), pages 180 to 199 and by Sease and Zechmeister in J. Am. Chem. Soc., 1947, pages 270 to 275. We may mention as such:

2,2'-bithienyl
5-methyl-2,2'-bithienyl
5,5'-dimethyl-2,2'-bithienyl
5-chloro-2,2'-bithienyl
5,5'-dichloro-2,2'-bithienyl
5,5'-dibromo-2,2'-bithienyl
4,5,4',5'-tetrabromo-2,2'-bithienyl
5,5'-diiodo-2,2'-bithienyl
5-iodo-5'-methyl-2,2'-bithienyl
5,5'-dimethyl-4,4'-diethyl-2,2'-bithienyl
α-Terthienyl
5-methyl-α-terthienyl
5,5''-dimethyl-α-terthienyl
5,5''-dibromo-α-terthienyl
5-iodo-α-terthienyl
5,5''-diiodo-α-terthienyl The α-polythienyls may be produced in different ways. By heating 2-iodo-thiophene with a metal, for example silver or copper powder, a mixture of α-bithienyl and α-terthienyl is obtained, whilst furthermore the reaction mixture contains small quantities of higher α-polythienyls. The various α-polythienyls obtained may be separated out of the reaction mixture in a pure state by known methods, for example by recrystallisation, by fractionated sublimation, or fractionated distillation or steam distillation or by chromatographic agency. The α-terthienyl may furthermore be obtained by heating a mixture of 2-iodo-thiophene and 2,5-diiodo thiophene with a metal, for instance copper powder. As an alternative, α-terthienyl may be obtained by heating a mixture of 2-iodo-thiophene and 5-iodo-2,2'-bithienyl with a metal, for instance copper powder.

The α-polythienyls may furthermore be obtained by converting 2-halogen thiophenes into a Grignard compound, which is then treated with anhydrous cuprichloride. The α-bithienyl may, for example, be obtained by treating 2-thienyl-magnesium bromide with anhydrous cuprichloride. The α-polythienyls substituted by saturated or unsaturated alkyl-groups may be produced by, in principle, analogous methods by starting from suitably substituted thiophene derivatives. The 5,5'-dimethyl-2,2'-bithienyl may, for example, be obtained by heating 2-iodo-5-methyl-thiophene with copper powder. The 5,5''-dimethyl-α-terthienyl may, for example, be obtained by heating 5-iodo-5'-methyl-2,2'-bithienyl with 2-iodo-5-methyl-thiophene in the presence of copper powder. The α-polythienyls substituted by halogen may, as an alternative, be produced by halogenating the corresponding non-halogen-substituted α-polythienyls. The 5,5''-dibromo-α-terthienyl may, for example, be produced by bromofication of α-terthienyl.

In accordance with the invention it has furthermore been found that α-terthienyl may also be obtained by extraction of Tagetes plants, preferably of the roots thereof. This extraction may, for example, take place by treating the dried roots with ethanol at about 70° C. and by extracting subsequently this extract in a percolator with petroleum ether at 60 to 80° C. After drying on magnesium sulphate and evaporation of the liquid obtained, a crude concentrate is obtained, which, if desired, may be further purified, by saponification with a solution of potassium hydroxide in methanol, by evaporation of the saponified mass, by mixing the residue with water, by extraction of the aqueous mixture obtained with petroleum ether and by inspissating this extract. Finally the compound may be obtained in a pure state by means of chromatography. 3-(thienyl-2)-2,2'-bithienyl was prepared as described by H. Wijnberg et al. (J. Am. Chem. Soc., 79, 1972 (1957)).

What is claimed is:

1. A method of destroying nematodes comprising contacting said nematodes with a composition containing a toxic amount of a polythienyl compound corresponding to the general structural formula:

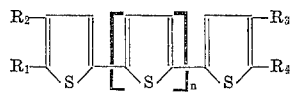

wherein $n$ represents a number selected from the group consisting of 0 and 1, $R_1$, $R_2$, $R_3$ and $R_4$ each represent substituents selected from the group consisting of hydrogen, methyl, propionyl, halogen, nitro, acetyl and phenyl radicals with the proviso that when $n$ represents 0, $R_3$ represents in addition the thiophene radical and $R_1$, $R_2$ and $R_4$ represent only hydrogen.

2. The method of claim 1 wherein the polythienyl compound is 5-propionyl-2,2'-bithienyl.

3. The method of claim 1 wherein the polythienyl is α-terthienyl.

4. The method of claim 1 wherein the polythienyl is 5,5'-dimethyl-2,2'-bithienyl.

5. The method of claim 1 wherein the polythienyl is 5,5''-dimethyl-α-terthienyl.

6. The method of claim 1 wherein the polythienyl is 5-bromo-α-terthienyl.

7. The method of claim 1 wherein the polythienyl is 5-nitro-2,2'-bithienyl.

8. The method of claim 1 wherein the polythienyl is 5-phenyl-2,2'-bithienyl.

References Cited in the file of this patent

UNITED STATES PATENTS

| | | |
|---|---|---|
| 2,527,372 | Moyle et al. | Oct. 20, 1950 |
| 2,600,126 | Nolan et al. | June 10, 1952 |
| 2,634,200 | Schlesinger | Apr. 7, 1953 |
| 2,690,413 | Janes et al. | Sept. 28, 1954 |

OTHER REFERENCES

Meisel et al.: Journal Am. Chem. Soc., vol. 72, May 1950, pages 1910–1912.

UNITED STATES PATENT OFFICE
CERTIFICATE OF CORRECTION

Patent No. 3,050,442                          August 21, 1962

Johan Dirk Bijloo et al.

It is hereby certified that error appears in the above numbered patent requiring correction and that the said Letters Patent should read as corrected below.

Column 2, Table 2, first column, line 3 thereof, for "Arguina" read -- Anguina --; same column 2, Table 3, heading of column 10 thereof, for "25/32" read -- 25/64 --.

Signed and sealed this 23rd day of April 1963.

(SEAL)
Attest:

ERNEST W. SWIDER
Attesting Officer

DAVID L. LADD
Commissioner of Patents